Patented June 10, 1930

1,763,615

UNITED STATES PATENT OFFICE

HAROLD W. ELLEY, OF WILMINGTON, DELAWARE

AGE-RESISTING RUBBER COMPOSITION AND METHOD OF PREPARING SAME

No Drawing.     Application filed May 29, 1929.  Serial No. 367,134.

This invention relates to a new rubber composition and to the method of preparing the same. More particularly it relates to a novel method for fortifying rubber against the deleterious effects of aging and to the resulting improved rubber product.

This application is a continuation in part of application Serial No. 132,897, filed August 31, 1926.

It has been demonstrated that the deterioration of rubber products with age is probably due to oxidation. The incorporation of various materials has been suggested for overcoming or mitigating this deterioration. Such materials are referred to in United States Patents 1,496,792, 1,515,642, 1,532,398 and 1,556,415. Moreover, additional information relative to the preservation of rubber products has been disclosed in German Patent 366,114 and in the British Patent 142,083.

In many cases the anti-aging materials are of no practical usefulness because of various objectionable properties which they possess. For example, in some cases it is impossible to properly disperse the compounds in the rubber. Such uneven dispersion results in uneven aging and the well-known "spotting" effects. In other instances, the anti-aging compounds have only a mild effect in preventing the oxidation and deterioration of the rubber. Moreover, the employment of many of the compounds so far suggested is impractical on account of their high price.

One of the principal objects of the present invention, therefore, is to provide an effective anti-aging compound which may be evenly and quickly dispersed in the rubber. Another object is to provide an effective compound of this type which may be economically produced.

With these objects in view, it has been discovered that excellent aging properties are imparted to rubber and similar substances by the incorporation therewith of certain secondary aromatic amines. For example, such compounds as phenyl-alpha-naphthylamine and diphenylamine are of outstanding merit. Many other members of the class of disubstituted amines are also useful.

The general procedure followed in employing members of this class of compounds may best be disclosed by specific examples which follow. It is to be understood that these embodiments of the process are submitted by way of illustration only, and that the particular compounds and conditions therein specified are susceptible of variation within wide limits.

Example 1

An anti-aging rubber composition containing phenyl-alpha-naphthylamine may be made according to the following formula:

Smoked sheets _____ 50
Amber crepe _____ 50
Zinc oxide _____ 121
Sulphur _____ 2.75
Diphenylguanidine _____ 1
Phenyl-alpha-naphthylamine _____ 1

This stock was cured at 141.5° C. for 30 minutes. It was then subjected to comparative tests, as to elongation and tensile strength, with a similar stock containing no phenyl-alpha-naphthylamine but cured to the same degree under exactly the same temperature conditions. After these tests, the two cured rubbers were submitted to accelerated aging tests in the Brierer-Davis oxygen bomb. At the end of 24 hours they were again tested. The results of the test are compared in the following table:

Prior to aging

|  | Tensile at 400 per cent elongation | Tensile at break | Elongation at break |
|---|---|---|---|
|  | Pounds | Pounds | Per cent |
| Containing phenyl naphthylamine | 854 | 2,370 | 600 |
| Containing no amine | 807 | 2,620 | 590 |

Subsequent to aging

|  | Tensile at 400 per cent elongation | Tensile at break | Elongation at break |
|---|---|---|---|
|  | Pounds | Pounds | Per cent |
| Containing phenyl naphthylamine | 950 | 2,100 | 580 |
| Containing no amine | 624 | 1,610 | 580 |

Example 2

1 part of diphenylamine was used instead of 1 part of phenyl-alpha-naphthylamine while maintaining the other ingredients and proportions employed in Example 1 constant. The resulting stock was cured at 141.5° C. for 45 minutes and comparative tests made both before and after aging in the oxygen bomb for 24 hours at 70° C. and 300 lbs. pressure. The results are tabulated below:

*Prior to aging*

| | Tensile at 400 per cent elongation | Tensile at break | Elongation at break |
|---|---|---|---|
| | *Pounds* | *Pounds* | *Per cent* |
| Containing diphenylamine | 1,098 | 2,330 | 620 |
| Containing no amine | 1,133 | 2,960 | 508 |

*Subsequent to aging*

| | Tensile at 400 per cent elongation | Tensile at break | Elongation at break |
|---|---|---|---|
| | *Pounds* | *Pounds* | *Per cent* |
| Containing diphenylamine | 1,135 | 2,360 | 590 |
| Containing no amine | 930 | 2,210 | 550 |

It is obvious from the tabulated results of the tests that rubber stocks containing the newly discovered anti-aging compounds possess markedly better aging properties than the stocks containing no such compound. Other secondary aromatic amines than those specified in the cases illustrated may be employed to impart anti-aging properties. For example, in place of phenyl-alpha-naphthylamine or diphenylamine, I may substitute di-tolyl amine, di-xylyl amine or tolyl alpha-naphthylamine (the ortho, para or meta form of tolyl alpha-naphthylamine may be employed). Likewise, meta xylyl or other xylyl substituted alpha-naphthylamine may be employed, or if desired beta-naphthyl groups may replace the corresponding alpha group in either the tolyl or xylyl compounds.

Also, it will be understood that my process is not limited to the treatment of caoutchouc but is adapted for the treatment of substitutes as well, including balata and gutta-percha. I, therefore, employ the term rubber in a generic sense.

The anti-aging compounds employed in the process are ordinarily incorporated into the rubber mix during milling, but they may be applied with good effect either before or after vulcanization by a procedure other than milling, as, for instance, in solution in suitable organic solvents or in water if their solubility permits. Such solutions may be applied to the surface of the rubber. It is also possible to expose the rubber to vapors of these substances.

Likewise, the curing may be effected by other methods than those disclosed, as, for example, by the well-known cold process. It is, therefore, not intended to limit the invention to any particular method of incorporating the reagent or curing the rubber.

The vulcanized rubber obtained as a result of the process herein set forth is uniformly colored and does not "spot". It possesses unusually good tensile strength, resistance to flexing and abrasion and excellently withstands aging.

What I claim is:

1. A method of preserving rubber which comprises subjecting it to vulcanization in the presence of a naphthylamine containing an alkyl substituted benzene group therein.

2. A method of preserving rubber which comprises subjecting it to vulcanization in the presence of a benzene substituted naphthylamine in which the benzene group contains at least one alkyl group.

3. A method of preserving rubber which comprises subjecting it to vulcanization in the presence of a material having the following formula: $R-\overset{H}{\underset{|}{N}}-R_1$, in which R is a naphthyl group and $R_1$ is an alkyl substituted benzene group, said material being substantially a non-accelerator of the rate of vulcanization of the rubber.

4. A method of preserving rubber which comprises subjecting it to vulcanization in the presence of a material having the following formula: $R-\overset{H}{\underset{|}{N}}-R_1$, in which R is an alpha-naphthylamine group and $R_1$ is an alkyl substituted benzene group.

5. A method of preserving rubber which comprises subjecting it to vulcanization in the presence of a material having the following structural formula: $R-\overset{H}{\underset{|}{N}}-R_1$, in which R represents a naphthyl group and $R_1$ represents a tolyl group.

6. A method of preserving rubber which comprises subjecting it to vulcanization in the presence of a material having the following structural formula: $R-\overset{H}{\underset{|}{N}}-R_1$, in which R represents an alpha-naphthylamine group and $R_1$ represents a tolyl group.

7. A rubber product that has been vulcanized in the presence of a material having the following formula: $R-\overset{H}{\underset{|}{N}}-R_1$, in which R represents a naphthyl group and $R_1$ represents an alkyl substituted benzene group.

8. A rubber product that has been vulcanized in the presence of a material having the following formula: $R-\overset{H}{\underset{|}{N}}-R_1$, in which R represents a naphthyl group and $R_1$ represents a tolyl group.

9. A rubber product that has been vulcanized in the presence of tolyl naphthylamine.

10. A rubber product that has been vulcanized in the presence of tolyl alpha naphthylamine.

11. A rubber product that has been vulcanized in the presence of a material having the following formula: $R-\overset{H}{\underset{|}{N}}-R_1$, in which R represents a naphthyl group and $R_1$ represents a tolyl group.

12. The process of producing an age resisting rubber composition which comprises incorporating with a rubber stock which contains a vulcanizing agent, a di-substituted amine containing an alkyl substituted phenyl group and vulcanizing.

13. A process of producing an age resisting rubber stock composition which comprises incorporating with a rubber stock containing the requisite vulcanizing ingredients, an amine of the type represented by the formula $R-\overset{H}{\underset{|}{N}}-R_1$ in which the radical R is selected from the class comprising the benzene and naphthylene series $R_1$ is an aliphatic hydrocarbon substituted benzene group, said material being substantially a non-accelerator of vulcanization.

14. A rubber product that has been vulcanized in the presence of a material having the formula $R-\overset{H}{\underset{|}{N}}-R_1$, in which R is a radical selected from a class comprising the naphthylene and benzene series, and $R_1$ is an alkyl substituted benzene group, said material being substantially a non-accelerator of the rate of vulcanization.

In witness whereof, I have hereunto signed my name.

Signed at Jackson Laboratory, in the county of Salem and State of New Jersey, this 15th day of May, 1929.

HAROLD W. ELLEY.